T. S. OGLE & R. F. POLANSKY.
KITCHEN SINK.
APPLICATION FILED MAY 25, 1912.
1,040,392.
Patented Oct. 8, 1912.
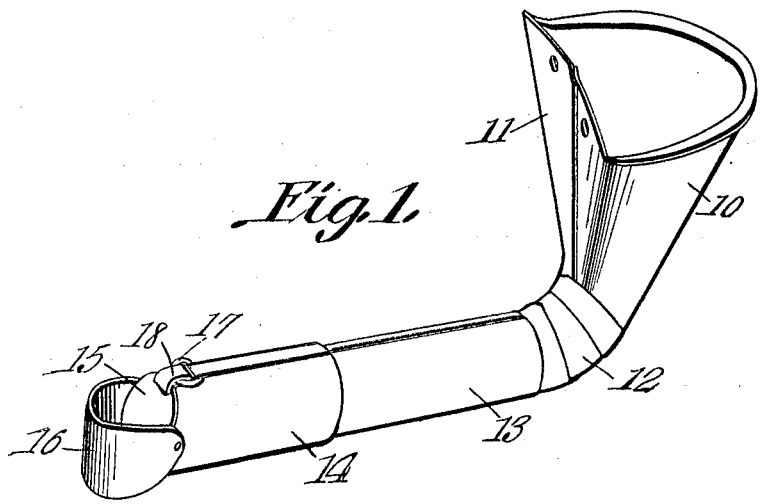
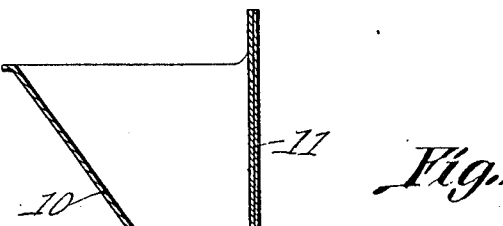
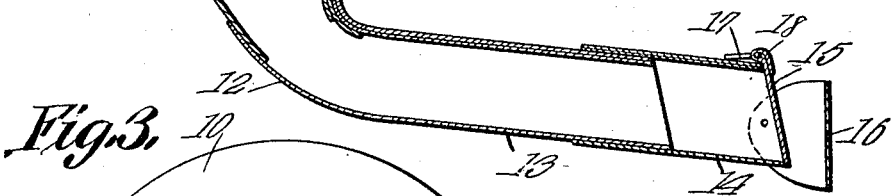
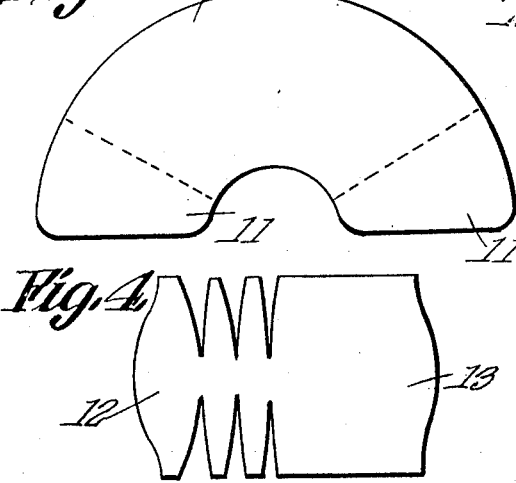
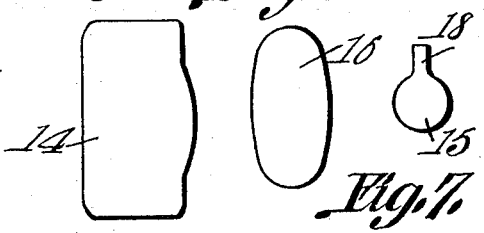
Thomas S. Ogle and
Robert F. Polansky, Inventors
by C.A. Snow & Co.
Attorneys
Witnesses

UNITED STATES PATENT OFFICE.

THOMAS SCOTT OGLE AND ROBERT F. POLANSKY, OF LYONS, TEXAS.

KITCHEN-SINK.

1,040,392.

Specification of Letters Patent.

Patented Oct. 8, 1912.

Application filed May 25, 1912. Serial No. 699,818.

*To all whom it may concern:*

Be it known that we, THOMAS S. OGLE and ROBERT F. POLANSKY, citizens of the United States, residing at Lyons, in the county of Burleson, State of Texas, have invented a new and useful Kitchen-Sink, of which the following is a specification.

This invention relates to kitchen sinks, and has for its object to provide a sink embodying a bowl designed to be secured to a wall, telescopic spouts connected to the bowl and adapted to pass through the wall to which the bowl is secured, means for permitting the discharge of the contents of the bowl through the spouts and for preventing the passage of air or pestilent insects through the spouts into the bowl, and a deflector coöperating with the outer spout and adjustable to direct the matter discharged from the spout into a barrel, tank, or the like positioned outside of the dwelling.

With the foregoing general objects in view, the present invention resides in the novel construction and combination of parts hereinafter set forth and particularly pointed out in the appended claim, it being understood that this device is susceptible of alterations or deviations in its details within the scope of the appended claim without departing from the spirit of the invention.

The invention has been illustrated in the accompanying drawing, wherein like reference characters denote corresponding parts, and wherein:—

Figure 1 is a perspective view of the sink. Fig. 2 is a vertical longitudinal section thereof. Figs. 3 to 7, inclusive, are plan views of the blanks from which the various parts of the sink are formed.

Referring specifically to the drawing, the present sink embodies a semi-conical bowl 10, the back or straight wall 11 of which is designed to be secured to the wall of the kitchen or other room, and to the apex or lower end of the bowl 10 there is secured an elbow 12, which is directed rearwardly from the bowl. A sloping spout or pipe 13 is attached to the elbow 12, and an extensible spout 14 is telescopically engaged to the free end of the said spout 13, the extensible spout 14 having its rear end cut diagonally to provide an inclined valve seat, and a loop 17 of wire or other suitable material being secured to the top of the spout 14 adjacent its free end. A circular valve 15 is seatable against the free end of the spout 14 and has a lip 18 projecting from its upper end and engaging the loop 17 in order that the valve 15 may swing vertically to and from the free end of the spout 14 in order to close and open the passage through the spouts. A U-shaped deflecting plate 16 has its ends pivoted to the sides of the extensible spout 14 adjacent its free end, and the body or intermediate portion of the deflecting plate 16 is arranged to swing over the free end of the spout 14 and above and below same. The said parts, with the exception of the loop 17 are preferably stamped from sheet metal of suitable quality and gage, the blanks from which the various parts are stamped, being shown in Figs. 3 to 7, inclusive. The sink is also preferably painted, plated, or otherwise polished or finished for purposes of appearance, wear, and to prevent corrosion.

In use, the bowl or basin 10 is arranged on the interior of the kitchen or the room, the back 11 of the bowl being secured to the wall of the kitchen, and the spout 13 and elbow 12 being passed through an opening provided in the said wall, so that the outer ends of the spout 13 and the spout 14 will project outside of the kitchen or dwelling. A barrel, tank or the like is placed below the outer end of the spouts on the exterior of the dwelling, and the spouts 13 and 14 being telescopically engaged provides for the adjustment of the spout 14 relative to the barrel, as will be understood. The deflecting plate 16 may also be swung so that the matter discharged from the spouts will be directed properly into the barrel without splashing or being directed falsely. This deflecting plate 16 may also be swung below the spout 14 when it is not desired to employ same, and the said deflecting plate may also serve as a stop for limiting the swinging movement of the valve 15. It will be noted that when any matter in the bowl 10 passes down the spouts 13 and 14, the same will swing the valve 15 open in order to permit the matter to be discharged, and after the discharge of the matter, the valve 15 by virtue of its weight will swing closed against the end of the spout 14, so as to prevent the ingress of air or pestilent insects.

A sink constructed in accordance with the present invention may be readily applied to the wall of a kitchen or other room, by simply providing a hole in the wall to which the bowl is to be attached, and passing the spouts through the said hole, in which event, the back of the bowl may be secured to the wall. In the foregoing manner, it will be apparent that this device is applicable to various buildings, so that dish-water and other slops may be poured into the bowl from the inside so as to be delivered on the exterior into the barrel, tank or the like, where it may be accumulated.

The present device is simple, substantial, and inexpensive in construction, and provides a desirable device for the purposes to which it is designed.

Having thus described the invention, what is claimed as new is:—

A kitchen sink embodying a semi-conical bowl whose back is designed to be secured to a wall, an elbow attached to the apex of the bowl and directed rearwardly therefrom, a sloping spout attached to the elbow, an extensible spout telescopically engaged with the free end of the said spout and having its free end cut diagonally to provide an inclined seat, a loop secured to the top of the extensible spout adjacent its free end, a valve seatable against the free end of the extensible spout and having a lip projecting from its upper end engaging the said loop, and a U-shaped deflecting plate having its ends pivoted to the sides of the extensible spout adjacent its free end.

In testimony that we claim the foregoing as our own, we have hereto affixed our signatures in the presence of two witnesses.

THOMAS SCOTT OGLE.
ROBERT F. POLANSKY.

Witnesses:
R. F. WUENOCHER,
ALWYN KEESE.

---

Copies of this patent may be obtained for five cents each, by addressing the "Commissioner of Patents, Washington, D. C."